Feb. 4, 1941.    E. O. SHREFFLER    2,230,340
ADJUSTING MEANS FOR KNEE ACTION MECHANISMS
Filed Sept. 3, 1940
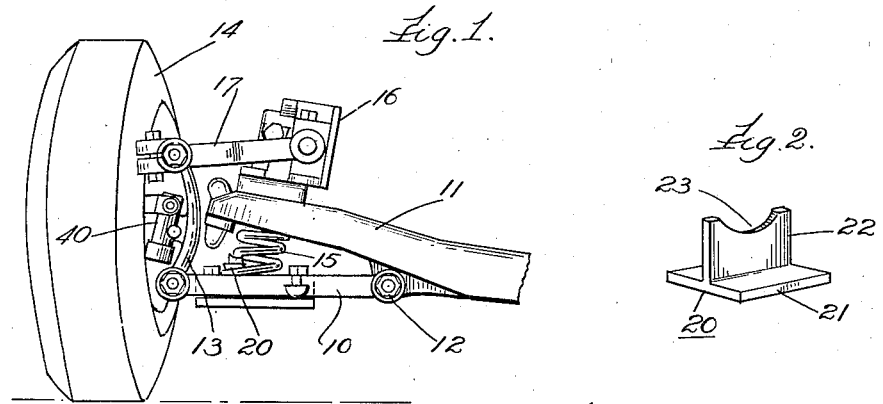
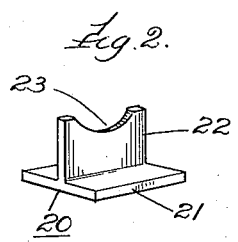
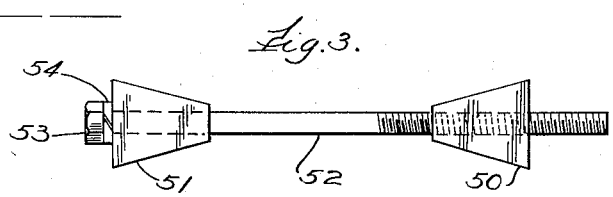
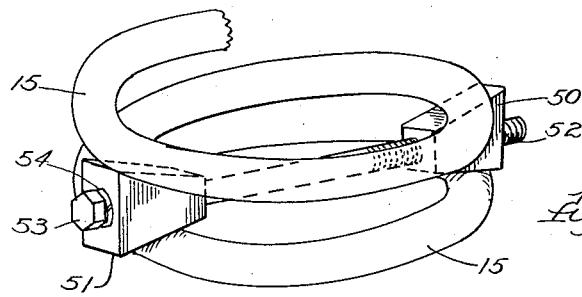
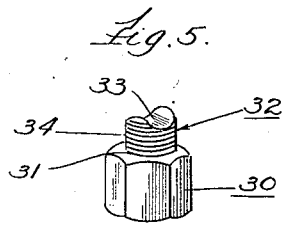
Inventor.
Elwyne O. Shreffler.
by James R. McKnight.
Attorney.

Patented Feb. 4, 1941

2,230,340

UNITED STATES PATENT OFFICE 2,230,340

ADJUSTING MEANS FOR KNEE ACTION MECHANISMS

Elwyne O. Shreffler, Manteno, Ill.

Application September 3, 1940, Serial No. 355,133

3 Claims. (Cl. 267—1)

This invention relates to a means for restoring the knee action mechanism of an automobile to normal operating condition after it has become out of adjustment due to wear.

Among the objects of my invention is to provide a readily attachable means for restoring the proper tension to a knee action coil spring so as to restore the front end of an automobile to its normal height, automatically assure camber adjustment and thus prevent hard steering and excessive tire wear due to improper wheel alignment, save the expensive replacement of knee action springs and restore the knee action mechanism to its normal state so that it may function exactly as when new. Further objects of my invention are to provide a means which is adjustable so that by movement or adjustment of said means from time to time the knee action mechanism will be restored to its original operation, thus providing a permanent repair and such other objects, advantages and capabilities as will later more fully appear and which are inherently possessed by my invention.

While I have shown in the accompanying drawing preferred embodiments of my invention, yet I wish it understood that the same are susceptible of modification and change without departing from the spirit of my invention.

Referring to the drawing, Fig. 1 is a detailed sectional view of one embodiment of my invention in operation; Fig. 2 is a perspective view of the embodiment shown in Fig. 1; Fig. 3 is a side elevational view of another embodiment of my invention; Fig. 4 is a detailed perspective view of the embodiment of my invention shown in Fig. 3 in operation; Fig. 5 is a detailed perspective view of another embodiment.

In the knee action construction which is employed in practically all modern automobiles there is a spring which absorbs the shock of bumps in the road. After the car has been driven for some time the spring loses part of its tension. This causes the front end of the car to move closer to the ground and gives an appearance of sagging. When the spring no longer has the original tension, the front wheel alignment and camber is disturbed. This causes difficult steering and excessive tire wear.

In order to remedy this condition, it has been necessary in the past to replace the knee action coil springs on both sides of the car and sometimes make other repairs for damage caused by the improper operation of the knee action mechanism. This would involve a cost of from fifteen to thirty dollars per car, which was prohibitive for persons engaged in the reconditioning and sale of used cars.

My invention provides an inexpensive means for restoring the coil spring of the knee action mechanism to normal operating condition, thus automatically assuring proper camber adjustment and front wheel alignment, raising the front end of the car to normal height, preventing hard steering and excessive tire wear and restoring the knee action mechanism to function in an identical manner with that of a new car without any expensive replacement of coil springs.

In the type of knee action construction with which my adjusting means is to be used, there is a knee action lower arm and support or base member 10 attached at one end to suspension cross member 11 at point 12, which is a point on the suspension cross member toward the middle of the car. The other end of said base member 10 is attached to the lower end of steering knuckle support 13 which is attached to steering knuckle 40, which is in turn attached to wheel 14. Mounted on said base member 10 is a coil spring 15. Said coil spring 15 is attached at its upper end to the suspension cross member 11. When the wheel 14 strikes a bump in the road, base member 10 moves upward against the tension of coil spring 15 and thus moves wheel 14 upward without moving suspension cross member 11 or disturbing the equilibrium of the car. A shock absorber mechanism 16 is mounted on the end of suspension cross member 11 above the point where coil spring 15 is attached to said suspension cross member 11. Knee action upper arm 17 is attached at one end to said shock absorber mechanism 16 and at the other end to the upper end of steering knuckle support 13. One end of steering knuckle support 13 is thus connected to knee action upper arm 17 and the other end to base member 10.

This constitutes the complete knee action mechanism. Base member 10, which is connected to suspension cross member 11 at point 12 toward the middle of suspension cross member 11, moves upwardly against the pressure of coil spring 15 when a bump is hit. Correspondingly, knee action upper arm 17 moves upwardly and holds the wheel in proper alignment. As coil spring 15 becomes worn and loses its tension, base member 10 is not forced back to its normal position, but remains above it. This results in raising the wheel 14, thus giving the car a saggy look in front. Since knee action upper arm 17 acts in accord with base member 10, it is also higher than usual. This causes the front wheels to be out of line and causes excessive tire wear and difficult steering, as well as possible injury to the wheel mechanism.

As a substitute for the complete replacement of the coil spring 15, I provide an inexpensive, readily attachable adjusting means which restores the entire knee action mechanism to its normal functioning condition.

One embodiment of my invention comprises a body member 20 having a base portion 21. Preferably at right angles to said base portion 21 is upright portion 22. Said upright portion 22 extends across the entire length of base portion 21. The upper end 23 of upright portion 22 is concave to engage one of the coils of coil spring 15.

In operation my body member 20 is usually inserted between two of the coils of coil spring 15 by spreading the coils apart with a flat bar or other suitable tool. The base portion 21 is usually placed on the lowest coil of coil spring 15 and the concave upper end 23 of upper portion 21 engages the coil above. Once the device has been inserted, the pressure of coil spring 15 prevents its accidental removal. The effect of my device in operation is to take one complete coil of the spring out of operation to strengthen and lengthen the spring and thus restore the normal operation of the knee action mechanism. After my device is inserted, the spring functions like new and the front end of the car is returned to its normal height.

The desired amount of height to be restored may be controlled by placing the body member 20 at different places in the spring or by placing two or three devices in the spring, thus taking several coils of coil spring 15 out of operation.

Another embodiment of my invention which provides a permanent means for adjusting the knee action coil spring comprises a body member 30 shaped in the form of a nut. The inner portion 31 of body member 30 is screw threaded to receive adjustable member 32. The outer portion 34 of adjustable member 32 is screw threaded and thus adapted to engage the screw threaded inner portion 31 of body member 30. The upper end 33 of adjustable member 32 is concave to engage one of the coils of coil spring 15.

In operation adjustable member 32 is moved by means of the engaging screw threads so as to be substantially enclosed within body member 30. Concave upper end 33 of adjustable member 32 remains above the top of body member 30. My device is then inserted between two of the coils of coil spring 15 with the bottom of body member 30 engaging the lowest coil and concave upper end 33 of adjustable member 32 engaging the next coil above. By means of a wrench or other suitable tool, body member 30 is rotated so as to cause, by means of the screw thread engagement, adjustable member 32 to move a suitable distance above body member 30. By this means the length of the device may be controlled so that the desired height and strengthening may be obtained. Adjustments may be made from time to time in order to compensate for additional wear, so that this embodiment of my invention provides a permanent means of maintaining the knee action mechanism in perfect operating condition.

Another embodiment of my invention which provides a more stable and balanced correction as well as means for adjusting the spring to the desired height and strength comprises two wedges 50 and 51. One of said wedges, 50, is attached to one end of bolt 52 by means of screw threads. The other wedge, 51, surrounds the other end of bolt 52 and is held thereon by means of nut 53 and washer 54. Bolt 52 may be rotated with respect to wedge 51.

In operation this device is inserted in coil spring 15 so that each of the wedges 50 and 51 is held between two of the coils of said spring 15. By turning bolt 52, wedge 50, which is attached to bolt 52 by screw threads, may be moved toward wedge 51. Bolt 52 may be turned by use of a wrench or other suitable tool on nut 53. When wedges 50 and 51 move closer together, the coils of coil spring 15 engage higher points on said wedges and the desired height and strengthening of coil spring 15 may thus be controlled. Since this embodiment of my invention engages both sides of coil spring 15, it provides a more stable and balanced adjustment of the knee action mechanism. Combined therewith is the adjustable feature provided by moving the wedges further into the coils of the spring.

Having thus described my invention, I claim:

1. In combination with a used knee action construction having a base member, a front suspension cross member attached to one end of said base member, a coil spring mounted on said base member, the upper end of said spring bearing against said front suspension cross member, and a wheel attached to said knee action construction, said spring having lost some of its tension from use, causing said knee action construction to be out of normal position and the wheel raised and out of camber, an adjustment member comprising a base portion, an upright portion extending above said base portion, the upper end of said upright portion having a concave portion sized to receive a coil of said spring, said adjustment member positioned with its base resting on one of the coils of said spring and the concave portion on the upper end of said upright portion engaging the coil thereabove, said adjustment member so positioned acting to restore tension to said spring, causing said knee action construction to return to normal position and lower the wheel to proper height and camber.

2. In combination with a used knee action construction having a base member, a front suspension cross member attached to one end of said base member, a coil spring mounted on said base member, the upper end of said spring bearing against said front suspension cross member, and a wheel attached to said knee action construction, said spring having lost some of its tension from use, causing said knee action construction to be out of normal position and the wheel raised and out of camber, an adjustment member comprising a nut shaped body member having a screw threaded opening, an adjustable member positioned within said opening and having screw threads adapted to engage the screw threads therein, said adjustable member having an upper end extending above said body member, said upper end having a concave portion sized to receive a coil of said spring, said adjustment member positioned with the bottom of said body portion resting on one of the coils of said spring, and the concave portion of the upper end of said adjustable member engaging the coil thereabove, said body member adapted to be turned by a wrench to move the upper end of said adjustable member a desired distance above said body member so as to restore tension to the spring, causing said knee action construction to return to normal position and lower the wheel to proper height and camber.

3. In combination with a used knee action construction having a base member, a front suspension cross member attached to one end of said base member, a coil spring mounted on said base member, the upper end of said spring bearing against said front suspension cross member, and a wheel attached to said knee action construction, said spring having lost some of its tension from use, causing said knee action construction to be out of normal position and the wheel raised and out of camber, an adjustment member comprising a lower portion, and an upper portion, said adjustment member positioned with its lower portion resting on one of the coils of said spring and its upper portion engaging the coil thereabove, said adjustment member so positioned acting to restore tension to the spring, causing said knee action construction to return to normal position and lower the wheel to proper height and camber.

ELWYNE O. SHREFFLER.